United States Patent [19]

Fukuda

[11] Patent Number: 4,995,468

[45] Date of Patent: Feb. 26, 1991

[54] LOAD WEIGHT MEASURING SYSTEM MOUNTED ON A CONSTRUCTION MACHINE

[75] Inventor: Masao Fukuda, Kawagoe, Japan

[73] Assignee: Kabushiki Kaisha Komatsu Seisakusho, Tokyo, Japan

[21] Appl. No.: 368,325

[22] PCT Filed: Dec. 4, 1987

[86] PCT No.: PCT/JP87/00942

§ 371 Date: Jun. 2, 1989

§ 102(e) Date: Jun. 2, 1989

[87] PCT Pub. No.: WO88/04413

PCT Pub. Date: Jun. 16, 1988

[30] Foreign Application Priority Data

Dec. 4, 1986 [JP] Japan .................. 61-287590

[51] Int. Cl.⁵ .................. G01G 19/08; G01G 19/10
[52] U.S. Cl. .................. 177/139; 177/141
[58] Field of Search .............. 177/136, 146, 147, 177, 177/178, 139, 141

[56] References Cited

U.S. PATENT DOCUMENTS 4,230,196 10/1980 Snead .................. 177/146 X
4,839,835 6/1989 Hagenbuch .................. 177/136 X Primary Examiner—George H. Miller, Jr.
Attorney, Agent, or Firm—Ronald P. Kananen

[57] ABSTRACT

A load weight measuring system mounted on a construction machine which, in order to prevent overload, subtracts the weight ($W_n$) of load that is really loaded relative to the predetermined weight ($W_o$) of load, to display a residual weight ($W'_n$) that can be loaded for each loading operation. The measuring apparatus comprises a second weight display unit (24) which displays an actually loaded weight as the measured weight for each loading operation, a first weight display unit (23) which displays the residual weight ($W'_n$) that can be loaded, and a control unit (7) which controls the display of weight in the first and second weight display units relying upon at least a boom cylinder hydraulic pressure (P) and a boom position (H) as detecting elements.

2 Claims, 4 Drawing Sheets

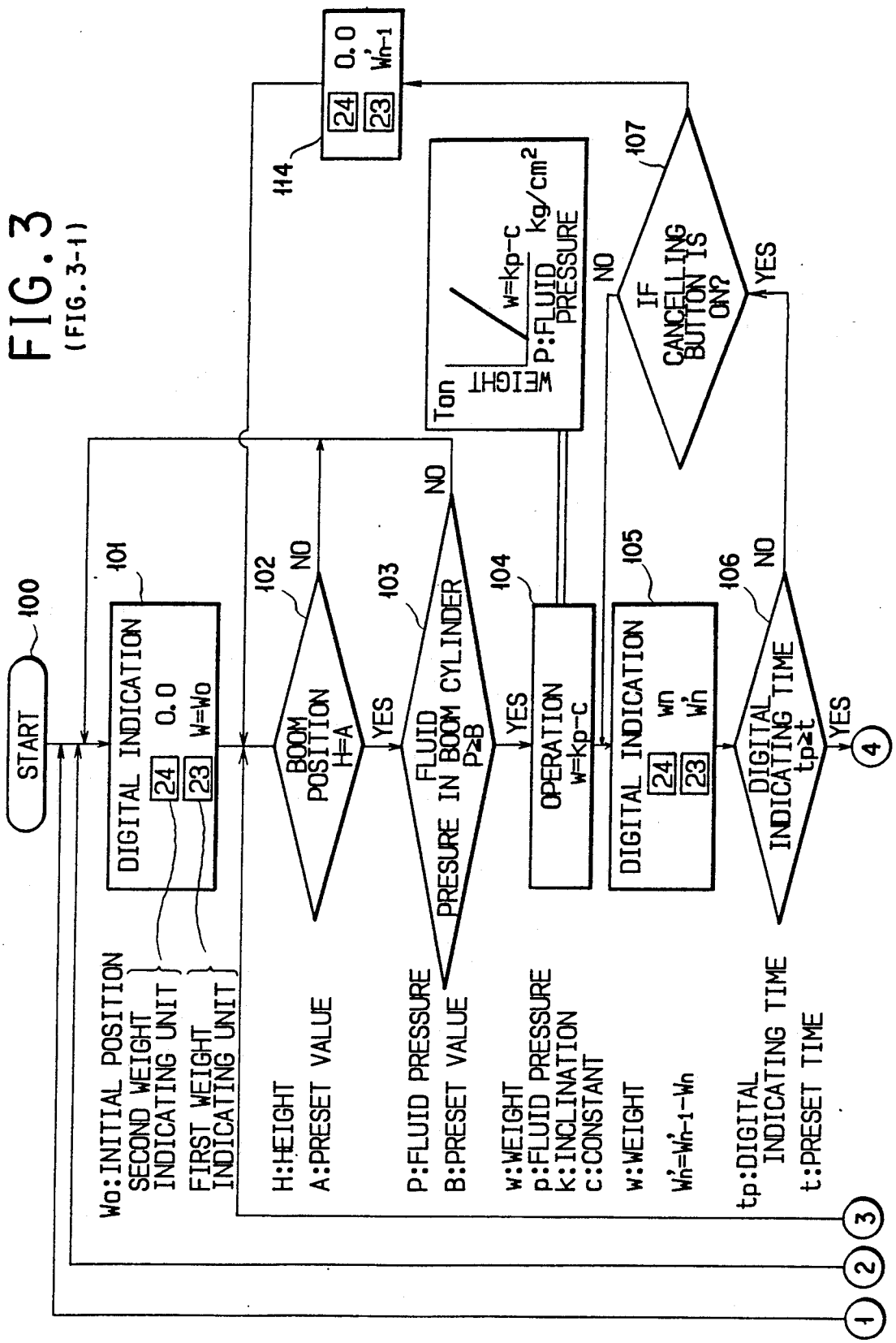

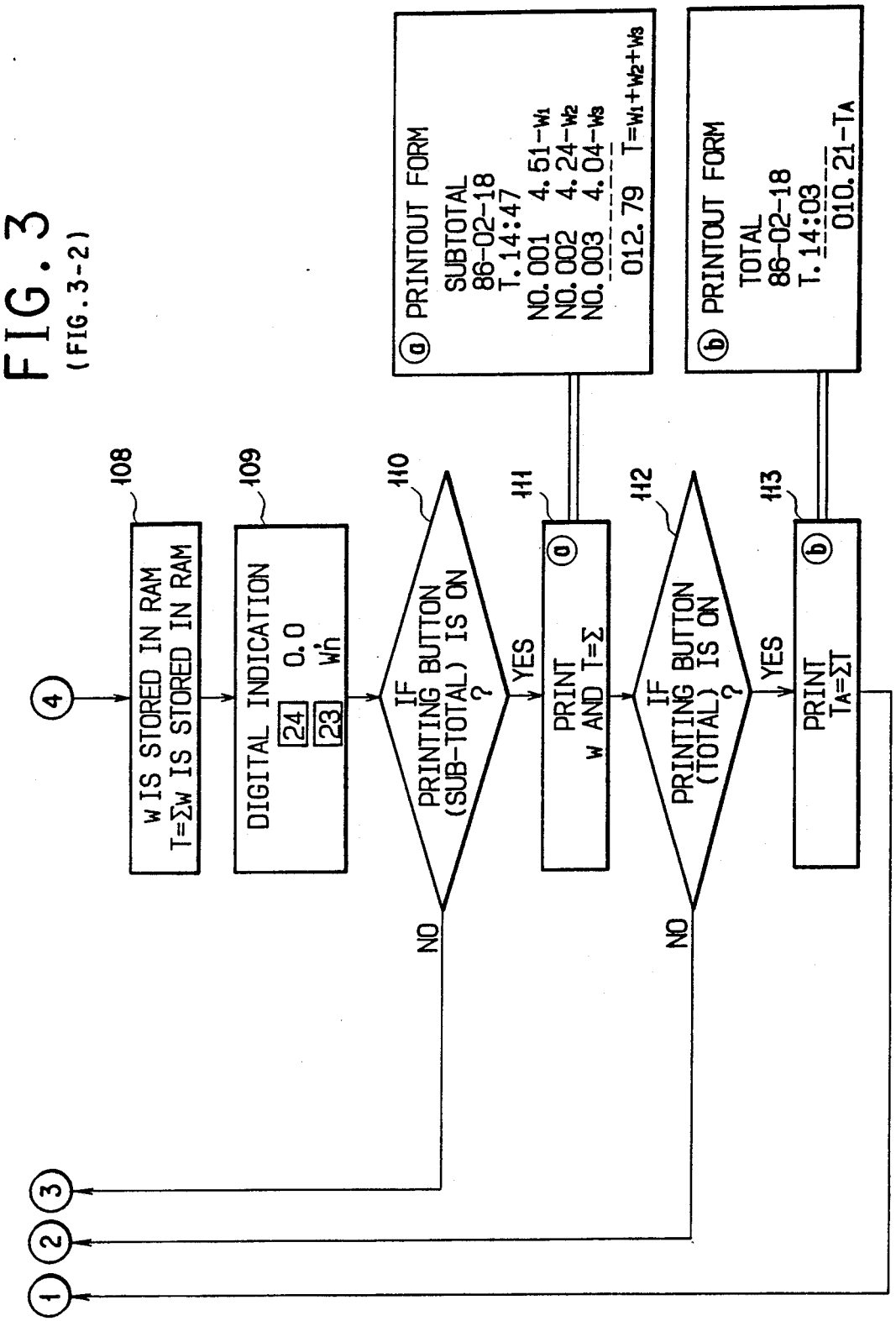

LOAD WEIGHT MEASURING SYSTEM MOUNTED ON A CONSTRUCTION MACHINE

TECHNICAL FIELD OF THE INVENTION

This invention relates to a load weight measuring system mounted on a construction machine, and more particularly to a load weight measuring system mounted on such kinds of machines wherein in case a dump truck and so forth is laden with a load by using a construction machine such as, for example, a wheel loader and so forth, the weight of the load actually loaded thereon by the bucket of the wheel loader is measured and compared by computation with a preset weight of the load to be laded thereon to thereby always indicate the weight of the remaining load or that which can be laded further thereon so that the overloading thereof can be prevented easily.

BACKGROUND TECHNIQUE OF THE INVENTION

Conventional load weight measuring systems of the kind specified to be mounted on construction machines are disclosed in pre-publications of Japanese Laid-open Patent Applications NOS. SHO 58-6422, SHO 59-9520, SHO 59-70919, SHO 59-75123, SHO 59-84118, SHO 59-84119, SHO 60-80721 and SHO 58-162816, and Japanese Laid-open Utility Model Application No. SHO 59-38576, etc.

These load weight measuring systems, which have already been disclosed, comprise a weight indicating unit and a printer unit.

The weight indicating unit serves to indicate the weight of one scoop of load by a bucket, and the weight of the load scooped by the bucket a number of times (or the cumulative weight of the load).

Therefore, it is satisfactory to find a half day or one day work volume. Whilst, when a dump truck is to be laden with a prescribed quantity of load, it is necessary to take on the load, for example, three or four times. However, to estimate the weight of the load to be scooped by the bucket at the final time, it is required for the operator or the driver to subtract the current indicated weight from the prescribed weight of the load in mental arithmetic. This method is troublesome and is liable to cause a miscalculation, and has posed a problem that because of overloading it becomes necessary in some cases to load the dump truck again, resulting in a waste of much labour and time.

SUMMARY OF THE INVENTION

The present invention has been made in view of the above-mentioned circumstances, and has for its object to provide a load weight measuring system mounted on a construction machine wherein the weight of the load actually laded on the machine is measured and compared by computation with a preset weight of the load to be laded on it to thereby always indicate the weight of the remaining load or that which can be laded further on it so that the overloading thereof can be prevented easily.

To achieve the above-mentioned object, according to one aspect of the present invention, there is provided a load weight measuring system mounted on a construction vehicle, comprising: a second weight indicating unit for indicating the weight of the load actually laded on a dump truck and so forth each time as a measured weight; a first weight indicating unit for indicating a substracted weight or the weight obtained by subtracting the current cumulative measured load weight from a preset weight of the load to be laded thereon (that is to say, the weight of the load which can be laded further thereon); and controlling means for controlling the weight indication in the first and second weight indicating units with using at least the fluid pressure in a boom actuating cylinder and the boom position a detecting elements.

The above-mentioned and other advantages, aspects and objects of the present invention will become apparent to those skilled in the art upon making reference to the following description and the accompanying drawings in which a preferred embodiment incorporating the principle of the present invention is shown by way of example only.

BRIEF DESCRIPTION OF THE ACCOMPANYING DRAWINGS

FIG. 3 is a flow chart showing the operation of the embodiment shown in FIG. 1.

DETAILED DESCRIPTION OF PREFERRED EMBODIMENT

Figure 1:
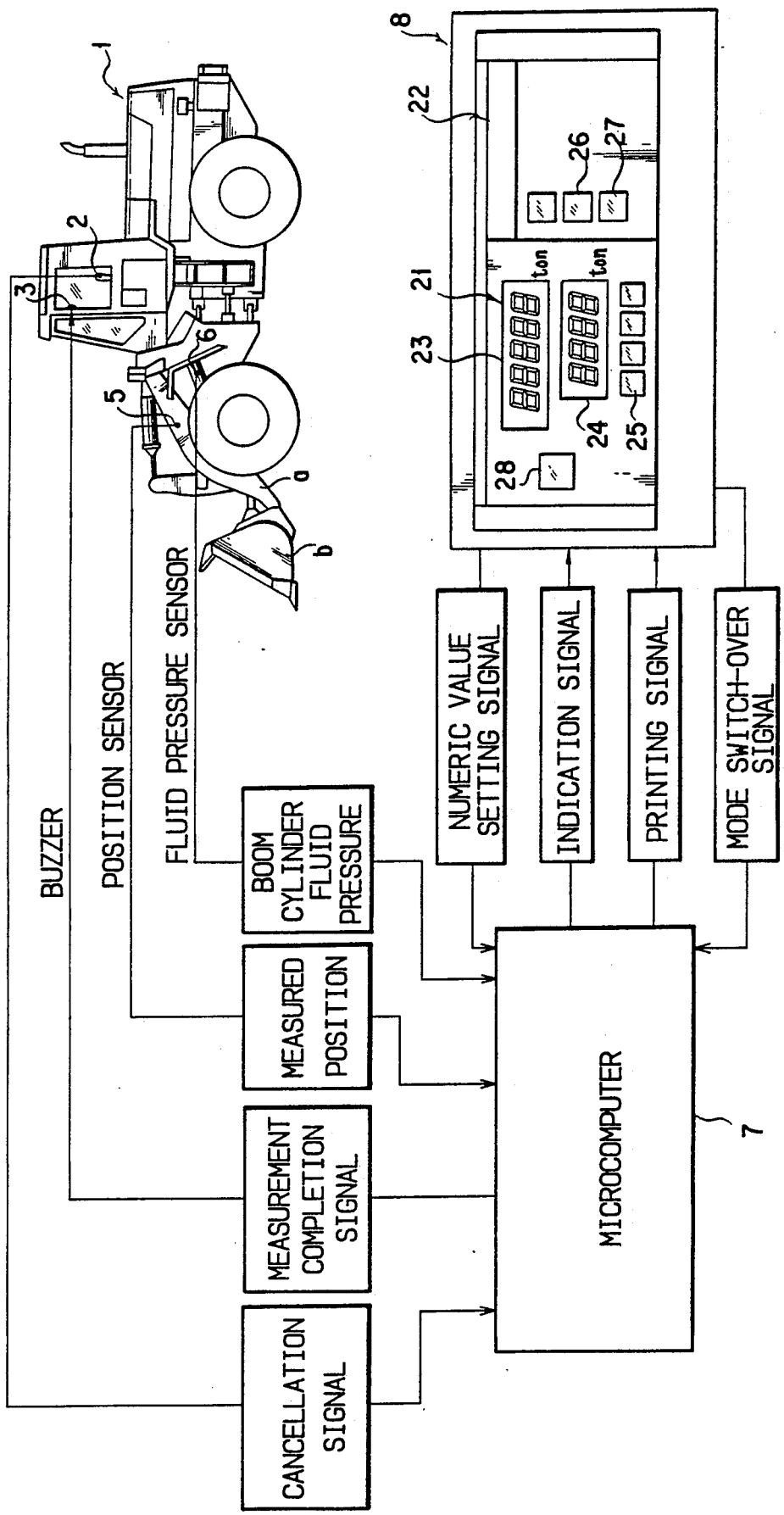
FIG. 1 is a schematic explanatory view illustrating the overall arrangement of one embodiment of the present invention.
Figure 2:
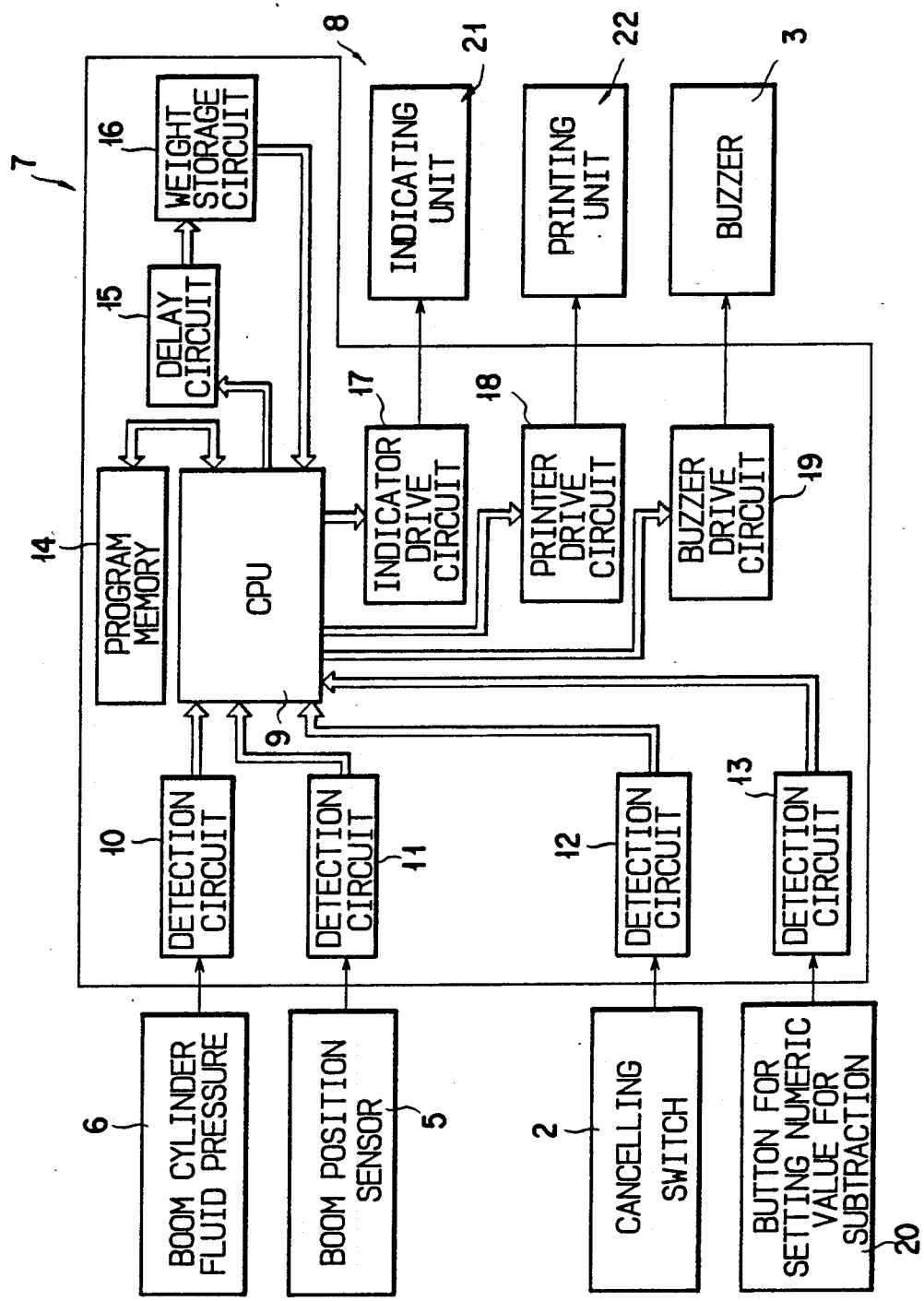
FIG. 2 is a block diagram showing the configuration of a controlling means for use in the embodiment shown in FIG. 1.

The present invention will now be described below by way of example only with reference to the accompanying drawings. In FIG. 1, there is shown the overall arrangement of a load weight measuring system mounted on a construction machine according to the present invention.

In FIG. 1, reference numeral 1 denotes a wheel loader for use as a construction machine. The wheel loader 1 is provided with a cancelling switch 2, a buzzer 3, a boom position sensor 5, and a fluid pressure sensor 6 of a boom actuating cylinder.

In FIG. 1, reference numeral 7 denotes a micro-computer, and 8 a weighing instrument.

The microcomputer 7 comprises a central control circuit or central processing unit (CPU) 9, detection circuits 11, 12 and 13, a program memory 14, a delay circuit 15, a weight storage circuit 16, an indicator drive circuit 17, a printer drive circuit 18, and a buzzer drive circuit 19.

The above-mentioned boom actuating cylinder fluid pressure sensor 6 is connected through the boom actuating cylinder fluid pressure detecting circuit 10 with the input side of the central processing unit 9. The boom position sensor 5 is connected through the boom position detecting circuit 11 with the input side of the central processing unit 9. The cancelling switch 2 is connected through its ON/OFF actuation detecting circuit 12 with the input side of the central processing unit 9. Further, a button 20 for setting numeric value for subtraction is connected through its ON/OFF actuation detecting circuit 13 with the input side of the central processing unit 9.

Further, the above-mentioned program memory 14 is connected with the central processing unit 9. The output side of the central processing unit 9 is connected through the delay circuit 15 and the weight storage circuit 16 with the input side of the central processing unit 9. Further, the output side of the central processing unit 9 is connected with the input sides of the indicator drive circuit 17, the printer drive circuit 18, and the buzzer drive circuit 19, respectively.

The above-mentioned weighing instrument 8 comprises a weight indicating unit 21 and a printing unit 22. The weight indicating unit 21 further comprises a first weight indicating unit 23 for indicating the weight of the remaining load or that which can be laded further on the vehicle, and a second weight indicating unit 24 for indicating the weight of a bucketful load.

In the first place, the weight $W_O$ of the load desired to be laded on a vehicle (or the weight of the load to be laded on a dump truck or a prescribed weight of the load to be loaded into a hopper), which is 32.0 tons, for example, is preset in the first weight indicating unit 23.

In the next place, the weight of the load laded by the bucket on the truck for the first time is measured. The measured weight $W_1$, for example, 8.0 tons is indicated in the second weight indicating unit 24. "Preset value ($W_O$)—Current cumulative measured weight ($W_1$)=the weight of the load which can be laded further on the truck (subtracted weight) ($W_1'$)", for example, $W_0(32.0) - W_1(8.0) = W_1'(24.0)$ is indicated in the first weight indicating unit 23. Thereafter, the weight of the load laded for the second time is measured. For example, the measured weight $W_2$ (9.0 tons) is indicated in the second weight indicating unit 24. At the same time, $W_1' - W_2 = W_2'(24.0 - 9.0 = 15.0$ tons) is indicated in the first weight indicating unit 23.

As a result, it becomes possible for the operator or the driver to make a visual judgement of the weight of the load required to be laded further on board the dump truck.

The output side of the indicator drive circuit 17 of the microcomputer 7 is connected with the weight indicating unit 21 of the weighing instrument 8. The printer drive circuit 18 is connected with the printing unit 22 of the weighing instrument 8. The buzzer drive circuit 19 is connected with the buzzer 3.

The above-mentioned weight instrument 8 is provided with a mode switch-over button 25 which serves to change over addition and subtraction modes, a totalizing button 26, a sub-total button 27, and a calibration button 28.

The operation of the apparatus will be described below.

When the mode switch-over button 25 is depressed, the addition and subtraction modes are indicated alternately. In the addition mode, a sub-total indicating lamp is lighted. In the subtraction mode, a remaining quantity indicating lamp is lighted.

To make all the figures clear, the totalizing button 26 and the sub-total button 27 need to be depressed continuously for a predetermined period of time. As a result, in the case of the addition mode, the second weight indicating unit 24 (which indicates weight) and the first weight indicating unit 23 (which indicates the sub-total) are both rendered 0.0. Whilst, in case of the subtraction mode, the second weight indicating unit 24 is rendered 0.0, and the first weight indicating unit 24 (which indicates the remaining quantity) indicates the preset weight $W_0$.

Zero point adjustment is made by the following operation. The calibration button 28 is first depressed, CAL is indicated in the first weight indicating unit 23. Subsequently, the bucket "b" of the wheel loader 1 which is in an empty condition is tilted to its maximum extent thereby raising the boom "a" which is located near the ground. The arrangement is made such that when the boom "a" has been raised to a height "A" set by the boom position sensor (that is to say; until the boom is located horizontally, for example) the buzzer 3 is actuated, and at the same time, the second weight indicating unit 24 indicates 0.0. Further, the first weight indicating unit 23 indicates 0.0 in the case of the addition mode, and the preset weight $W_0$ in the case of the subtraction mode.

In the next place, the operation of the load weight measuring system mounted on a construction machine in the subtraction mode will be described with reference to the flow chart shown in FIG. 3.

In the first place, the load weight measuring system is rendered all-clear. Stating in brief, the first weight indicating unit 23 indicates the preset weight $W_0$, whilst the second weight indicating unit 24 indicates 0.0. (STEPS 100, 101).

Subsequently, the load is scooped by the bucket "b" tilted to its maximum extent, the buzzer 3 will sound at the position "A" preset by the boom position sensor. The weight w of one scoop of load by the bucket "b" to be measured is indicated in the second weight indicating unit 24, and "preset weight $W_0$—Current cumulative measured weight $\Sigma w$"; that is to say, the subtracted weight W' or the value obtained by subtracting the current cumulative weight of the load which has been laden on the dump truck from the preset weight of the load to be laden thereon (or the weight of the load which can be laden further thereon) is indicated in the first weight indicating unit 23. (STEPS 102, 103, 104 and 105).

Further, in case the boom position H is not equal to the preset value A at STEP 102, and in case the fluid pressure P in the boom actuating cylinder is lower than the preset value "B" at STEP 103 the system will automatically be returned to STEP 101.

In case the digital indicating time tp in the first and second weight indicating units 23 and 24 is equal to or more than the preset time t, the weight $w_n$ of one scoop of load by the bucket and $T - \Sigma w$ are stored in the weight storage circuit. (STEP 106). Simultaneously with the storage of Wn and $T - \Sigma W$, the second weight indicating unit 24 indicates $w_n = 0.0$, and the first weight indicating unit 23 continues to indicate $W'n - 1 - w_n = W'n$ (STEP 108).

When the system has proceeded to STEP 108, the first weight indicating unit 23 will indicate the subtracted weight W'n, and the second weight indicating unit 24 will indicate "0".

In case the weight indicating time "tp" is less than the preset time "t" at STEP 105, the currently indicated $w_n$ can be cleared by the cancelling switch 2. In the case where it is not desired by the operator or the diver to store the measured weight in the computer, the cancelling switch 2 is turned on, and the second weight indicating unit 24 will indicate 0.0, and the first weight indicating unit 3 will indicate the previous subtracted weight W'n−1. And, the system will return to STEP 102. If the stored values cannot be cleared by the cancelling switch 2, the cancelling switch 2 is kept off, and the system will return to STEP 105.

After proceeding to step 108, when the print button (sub-total button 27) is depressed, the current cumulative measured weight $T = \Sigma w$ and its content ($w_1$, $w_2$, $w_3$, . . . $w_n$) are printed. (Printout Form a ) (STEPS 110, 111)

Simultaneously with the printout operation, the first weight indicating unit 23 will indicate the preset weight Wo, and the second weight indicating unit 24 will indicate 0.0. Then, the apparatus is ready for loading the next dump truck (STEP 101). In case the print button is not depressed, the system will return to STEP 102 so that the same dump truck can be laded with the load for the (n+1)th time and thereafter. At STEP 105, the first weight indicating unit 23 will indicate $W'_{n+1} = W'_n - w_{n+1}$; that is to say, the value obtained by subtracting the weight $W_{n+1}$ which is measured for the (n+1)th time from $W'_n$ ($=W'_{n-1} - w_n$).

When the total weight print button (totalizing button 26) is depressed, after "all clear" (which is made by depressing the sub-total button and the totalizing button continuously for a predetermined time) is made, the total weight of the load which has been laden on the dump truck is printed out.

STEPS 112, 113

Thus, the weight of the load on board a vehicle can be confirmed readily by the load weight measuring apparatus mounted on a construction vehicle according to the present invention.

I claim:

1. A load weight measuring system mounted on a construction machine of the type which includes a boom operative by fluid pressure in a boom actuating cylinder which controls said boom having a load-transferring member connected thereto, comprising:
   - a boom position sensor for sensing a position of said boom;
   - a boom actuating cylinder fluid sensor for sensing boom cylinder pressure in said boom actuating cylinder;
   - a first weight indicating unit for indicating the weight of a load actually laded on a loadable vehicle by said construction machine each time as a cumulative measured load weight;
   - a second weight indicating unit for indicating a substracted weight as the weight obtained by substracting the current cumulative measured load weight from a preset weight of the load to be laded thereon to define the weight of the load which can be laded further on said loadable vehicle by said construction machine; and
   - controlling means for controlling the weight indication in the first and second weight indicating units using at least the fluid pressure in the boom actuating cylinder and the boom position as detecting elements, whereby the weight of the load actually loaded by the load-transferring member of said construction vehicle is measured and compared by computation with a preset weight of the load to be laded thereon thereby to indicate the weight of the remaining load which can be further laded thereon so that overloading thereof can be prevented.

2. A load weight measuring system mounted on a construction machine as claimed in claim 1, characterized in that said controlling means is a microcomputer which includes;
   - a central controlling circuit or central processing unit (CPU);
   - a boom actuating cylinder fluid pressure detecting circuit connected with the CPU;
   - a boom position detecting circuit connected with said CPU;
   - a cancelling switch ON/OFF actuation detecting circuit connected with said CPU;
   - an ON/OFF actuation detecting circuit for a button for setting a numeric value for substraction, which is connected with said CPU; a program memory connected with said CPU; a delay circuit connected with said CPU;
   - a weight storage circuit connected through the delay circuit with said CPU;
   - an indicator drive circuit connected between said weight indicating unit and said CPU;
   - a printer drive circuit connected between a printing unit and said CPU; and
   - a buzzer drive circuit connected between the buzzer and said CPU.

* * * * *